Nov. 18, 1958 — W. R. SEIGLE — 2,860,751
POSITIONING DEVICE
Filed July 5, 1956 — 2 Sheets-Sheet 1

INVENTOR:
WILLIAM R. SEIGLE,
BY Charles M. Hutchins
HIS ATTORNEY.

Nov. 18, 1958 W. R. SEIGLE 2,860,751
POSITIONING DEVICE
Filed July 5, 1956 2 Sheets-Sheet 2

INVENTOR:
WILLIAM R. SEIGLE,
BY Charles M. Hutchins
HIS ATTORNEY.

United States Patent Office 2,860,751
Patented Nov. 18, 1958

2,860,751

POSITIONING DEVICE

William R. Seigle, New Hartford, N. Y., assignor to General Electric Company, a corporation of New York Application July 5, 1956, Serial No. 596,070

10 Claims. (Cl. 192—143)

This invention relates to the art of positioning objects in accord with programmed control and more particularly relates to the art of positioning objects from point-to-point in response to programmed control.

With the recent increase of interest in apparatus and processes for the automatic manufacture of equipments, it has become increasingly important to provide method and means for the precise positioning of objects in response to programmed control. Of greatest difficulty in this general field is the automatic positioning of objects produced only in low job-lot quantities. An important section of this general problem has been found in programmed control of apparatus requiring accurate point-to-point positioning. Examples of such machines are component placement machines, pin placement machines, drill presses, automatic shearing machines, and bending machines, as contrasted with machines wherein the operation on the object takes place over a prescribed path such as milling machines.

In machines for such point-to-point operation, the processing of manufactured equipment is greatly simplified by establishment of a standard grid to which the operations are referenced. Such a grid has parallel rows and parallel columns intersecting at right angles. Each row and column is spaced at fixed distance from its neighbor.

In preliminary design, operations such as pin setting are planned to occur only at the intersections of the grid lines. It is then possible to control the machine performing the operation by identifying each intersection by non-ambiguous identification of the coordinates of the intersection and directing the machine to the described point by use of this coordinate information.

In recent years, the use of a 0.1-inch grid has become popular because it offers the required precision of operation location for present equipment, such as printed circuit boards, without introducing unwanted complexity by unnecessary numbers of operation points to be selected. Of course, other grid spacings are useable for different applications.

In order to use the coordinate information in machines, it has been necessary to provide means for moving the object and precisely stopping it when a desired point has been reached.

The prior art has used precision blocks which can be inserted to stop object movement at the required point. The blocks are ground to multiples of the grip spacing, and the total inserted length of the blocks, which mechanically block object movement, determines the final position of the object. Such an arrangement suffers from the disadvantage of excessive cost when remote controlled or programmed selection is to be used.

It is, therefore, one object of my invention to overcome the disadvantages of the prior art in programmed control of object locating apparatus.

It is a further object of my invention to provide means for accurately positioning an object at a point.

It is a further object of my invention to provide methods and means to detect the approach to the desired position and decrease the speed of approach in response to this detection.

It is also an object of my invention to move an object to various predetermined locations where desired operations may be performed thereon.

A further object of my invention is to provide method and means for programmed control of object location.

A still further object of my invention is to provide method and means for using digital-coded information to position an object for operation.

In one embodiment of my invention I have provided a rack extending along each coordinate of desired object movement. Affixed to the object are latch assemblies which move over the racks. Each latch assembly comprises a plurality of latches so spaced with respect to the rack that as the latch assembly is moved in fixed increments, a different latch is aligned with a tooth on the rack. Selection of the desired increment is provided by supplying triggering power to one of the latches. To control movement over many increments, actuating power is supplied to the triggered latch along increments of movement larger than the largest increment selectable by choice of the proper latch. The positioning of the actuating power and the triggering power is arranged so that digitally coded programmed input information will control object location without ambiguity over the entire operating range.

In another embodiment of my invention I have provided means for sensing the approach of the object to the desired position, and, in response to this sensing, to slow down the object, thereby preventing excessive wear of the latch and rack and reducing the shock of stopping.

The novel features which I believe to be characteristic of my invention are set forth with particularly in the appended claims. My invention itself, however, both as to its organization and method of operation, together with further objects and advantages thereof, may best be understood by reference to the following description, taken in connection with the accompanying drawings in which:

Figure 1:
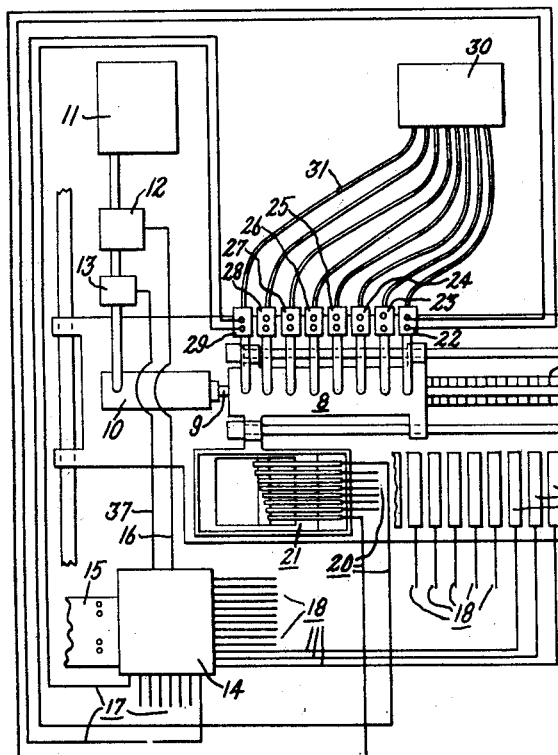
Figure 1 is a plan view of one embodiment of my invention.

In Figure 1 there is shown an object 1 mounted on the work table 2. During operation, it is desired to move the various points, as for example, point 3 on the object, under the operating head 4 for operations such as setting of a pin or punching a hole in the object. There may be many such points 3 on the object but each is located at the intersection of the particular grid used. For simplicity in explanation, but not intended to limit the scope of application, the discussion will assume the use of a 0.1-inch grid.

When it is desired to move point 3 under the operating head 4, movement along coordinate axis marked X and Y from a reference point 5 is effected by push-rods 6 and 7 respectively. The equipment associated with each coordinate movement is identical and discussion will be limited to only one.

The push-rod 6 is rigidly secured to the latch assembly 8. The latch assembly, in turn, is connected to the connecting rod 9 which is fixed to and moved by the piston of a hydraulic ram 10. Hydraulic fluid is pumped from the source 11 through an operating valve 12 and a constriction valve 13 into hydraulic ram 10 to move the work table 2 in the X direction.

Input information is provided from programmer 14 which derives information from a perforated tape 15.

The tape carries binary coded information, and the programmer is a conventional reader, such as a reader containing a plurality of spring fingers contacting a charged plate through the holes punched in the tape. It will be apparent to those skilled in the art that punched cards and a punch card reader could be utilized also.

When it is desired to move the object 1 to a desired position for operation upon it by operating head 4, the tape carries a signal transmitted over connection 16 to open valve 12, which could be a solenoid operated mechanical valve. This valve releases hydraulic fluid from source 11 to actuate the hydraulic ram producing movement in the X direction. At the same time that power is supplied over lead 16 to the hydraulic solenoid valve 12, electric power is supplied over lead group 17 to the operating solenoids, 22—29, affixed to the top of the latch assembly 8. The ground return for this power is supplied over lead group 18 to the commutator bars 19 extending along the direction of travel of the latch assembly 8. A lead group 20 transmits the power from the latch operating solenoids to a plurality of brushes 21 which contact the commutator bars 19. An electrically operated valve, 22 through 29, is associated with each latch carried by the latch assembly. Each valve controls the application of pressure from a pneumatic pressure source 30, supplied over connection 31, to a latch driving mechanism. When the proper solenoid is energized the pneumatic pressure will drive one latch into a land to engage a tooth of the rack 32, stopping the object movement.

Since the object location must be determinable in 0.1-inch increments over a considerable distance of travel, the latch assembly is constructed to provide 0.1-inch increment selection and further provisions are made for extended travel of the latch assembly before engagement. To ensure compatibility with a digital input information such as a binary coded input with minimum complexity when using a 0.1-inch grid, the latch assembly is arranged to provide selection of movement of incremental spacings of 0.1-inch controllable over a range to 0.7-inch. This amount of movement is selected by engaging one of the latches. For control over the entire range, engagement of the selected latch with the rack is controlled in 0.8-inch increments by the placement of the commutator segments. Therefore, to position the object to 1.5 inches, for example, power is supplied to the solenoid 29 which would allow 0.7-inch movement before engagement with the rack. This power is supplied over lead group 17. The ground return for this power is supplied to the commutator section spaced 0.8-inch from the reference stop. Therefore, when the latch assembly reaches 1.5-inch (i. e. 0.8-inch+0.7-inch), a complete circuit will exist from the power supplied, through the latch solenoid, lead group 20, the brush assembly 21, and the grounded commutator bar. Thus, current will flow to release pneumatic pressure forcing the latch into engagement with the rack, stopping the object at the desired position. By so arranging the selection of increments, it will be recognized that the latch assembly is controlled by the three least significant binary digits of a binary coded input while the grounding of the commutator bars is controlled by the remaining binary digits.

Because of the applicability of this apparatus to operations on relatively light objects such as punching holes in printed circuit boards, the load has been very light and high speed movement is, of course, possible and desirable. In such embodiments, it is desirable to slow down movement of the work table 2 as the object approaches the desired position. For this purpose, a constriction valve 13 has been provided in the hydraulic line from the hydraulic pressure source 11 to the hydraulic ram 10. This valve is operated by a signal from the programmer 14 over lead 37 to constrict flow of hydraulic fluid just before the object reaches the desired position. In this manner, object movement can be made at high speed without excessive vibration and shock on stopping the object at its final position. This valve can be a solenoid operated valve powered by electrical signal over lead 37. The derivation of the signal is made by the brush assembly placement and will be more completely explained in connection with Figure 3.

Figure 2:
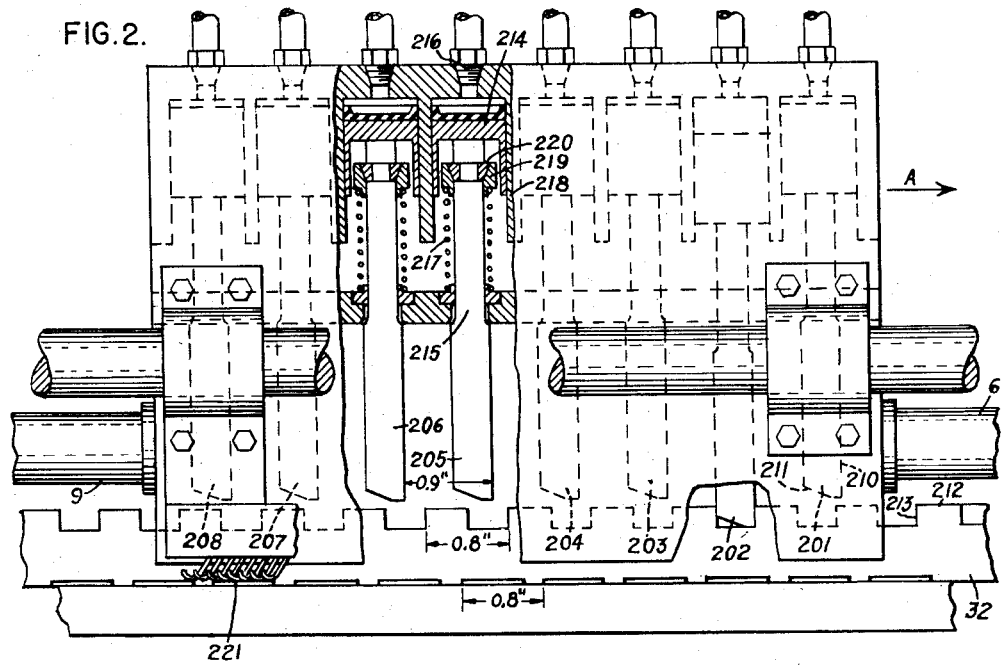
Figure 2 is a cross-sectioned view of the latch assembly shown in Figure 1.

The operation of the latch assembly in selection of incremental spacing may best be understood by reference to Figure 2, which shows a detail view of the latch assembly shown in Figure 1 and in which similar parts are identically numbered. In Figure 2 is shown pushrod 6 for movement of the work table and the connecting rod 9. The latch assembly carries a plurality of latches 201 through 208. These latches are mounted above the rack 32. Each latch has a rack engaging surface 210 and a beveled section 211. The rack 32 is comprised of a plurality of square teeth 212 with interposed lands. If a 0.1-inch grid is employed, the teeth 212 are spaced with the latch engaging face 213 of each tooth 0.8 inch apart. The latches 201 through 208 are so positioned that the rack engaging surface 210 on successive latches are spaced 0.9 inch apart. In this manner, a vernier relationship is established whereby operation of the various latches will provide selection of incremental spaces of movement in the direction of arrow A.

Each latch is connected to a piston 214 through a body portion 215. To operate the piston, compressed air is admitted through orifice 216 in response to the operation of the solenoid operated valve (26, Figure 1) or its equivalent for the remaining latches. In order to return the piston to its unengaged position, a spring 217 surrounds the body portion of the latch and operates to drive the piston to the top of the travel in cylinder 218 by the force exerted on retainer 219 and the split washer 220.

The width of the rack teeth and the width of the latches are relatively unimportant as long as the latch width and tooth width are sufficiently wide to prevent ambiguity in latch engagement positions.

The utilization of a reasonably wide tooth width in combination with the bevel at the base of the latch, has the advantage of preventing full engagement of the latch into the rack until the desired position is reached. This advantage is useful when the invention is applied to automatic equipment wherein an interlock switch initiating operation of the operating head is operated by the full travel of the latch. The advantage of such construction will be apparent to those skilled in the art.

As shown in Figure 2, latch 202 is engaged with the rack. This corresponds to an incremental movement of 0.1 inch. As should be evident if latch 203 was operated an additional incremental spacing of 0.1 inch movement would be added, or a total movement of 0.2 inch. Similarly, operation of the remaining latches will give varying incremental movements before engagement, and therefore, latches 201 through 208 will provide for movement of the latch assembly controllable over a 0.7 inch travel in 0.1 inch increments.

To provide control of movement in larger increments, which of course, is necessary in the construction of operating equipments, the brush assembly at 221 makes contact with commutator bars 19 spaced 0.8 inch apart along the side of the rack. As explained with respect to Figure 1, the commutator bars supply a ground return for the actuating power supplied to the individual latch solenoids. The operation of my invention in providing control of incremental spacing over long distances of travel may best be understood by reference to Figure 3, which shows in schematic form the wiring diagram associated with the apparatus shown in Figure 1.

Figure 3:
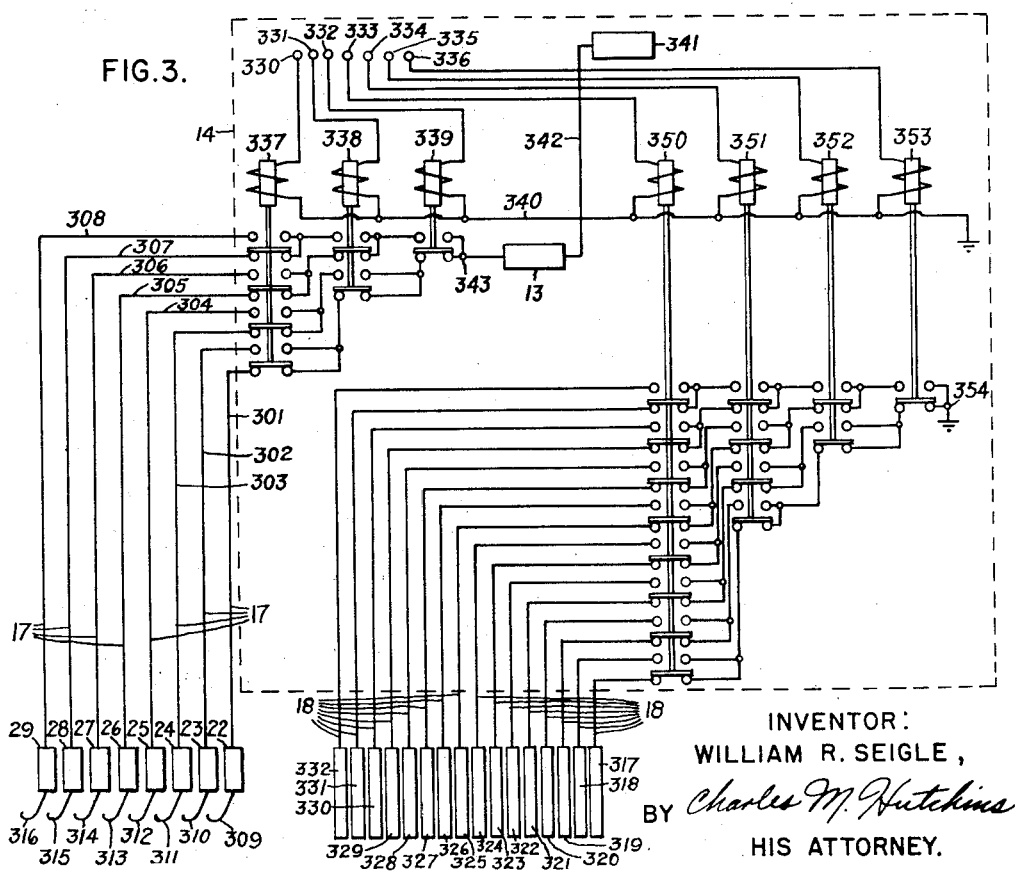
Figure 3 is a schematic diagram of one embodiment of my invention.

In Figure 3 there is shown in programmer 14. The programmer 14 is adapted to supply electric signals to the pneumatic control solenoids 22 through 29, which control the operation of the individual latches shown in Figure 2 as 201 through 208 respectively.

The signal from the programmer is supplied to the solenoids over lead group 17, which, in this embodiment, comprises eight individual leads 301 through 308 respectively. Return for the power supplied over these leads is supplied by the brushes 309 through 316 which supply the individual returns for the power supplied to solenoids 22 through 29 respectively. The brushes complete an electric circuit by contacting one of the commutator bars 317 through 332, to which a ground return is connected over lead group 18 which, in this embodiment, comprises sixteen individual connections.

Therefore, if power is supplied to one of the connections in lead group 17, a selection of incremental spacing up to 0.7 inch will be made. As the brush contacts travel across the commutator sections, contact with the grounded section will initiate the appropriate solenoid so that the incremental spacing device is operated at the correct position along the entire travel of the latch assembly.

The binary input information is fed to programmer 14 in the form of punched tape in one embodiment. With such a circuit arrangement terminals 330 through 336 are supplied with power in accordance with the bit information of each binary digit. For example, each terminal could have a voltage applied to it if the binary bit 1 exists; if the bit 0 exists, no voltage will be applied. Terminals 330, 331, 332, 333, 334, 335 and 336 are dimensioned to have binary significance of 1, 2, 4, 8, 16, 32 and 64 respectively. Since the three least significant digits (1, 2 and 4 digit) of the binary word control the operation of the solenoids on the latch assembly, means must be provided to properly supply power to leads 301 through 308 in accordance with this input information. For this purpose relays 337, 338 and 339 are supplied. A ground supply for the three relays is supplied through connection 340. Power for application to the leads 301 through 308 is supplied from a power source 341 through connection 342 and constriction valve 13 to terminal 343. Contacts associated with relays 337, 338 and 339 are connected in a standard binary tree to supply a direct connection from terminal 343 to a single one of connections 301 through 308 in accordance with the binary coded information supplied to terminals 330, 331 and 332. Table indicates the input terminal powered, the connection made from terminal 343 to the various output connections, the increment of movement selected, and the latch (Figure 2) selected.

*Table*

| Input Terminal Powered by Binary Input | | | Connections From Terminal 343 | Increment Selected | Latch Selected |
|---|---|---|---|---|---|
| -- | -- | -- | 301 | 0 | 201 |
| -- | -- | 330 | 302 | 0.1 | 202 |
| -- | 331 | -- | 303 | 0.2 | 203 |
| -- | 331 | 330 | 304 | 0.3 | 204 |
| 332 | -- | -- | 305 | 0.4 | 205 |
| 332 | -- | 330 | 306 | 0.5 | 206 |
| 332 | 331 | -- | 307 | 0.6 | 207 |
| 332 | 331 | 333 | 308 | 0.7 | 208 |

Similarly, the binary input information concerning the more significant digits are utilized to operate relays 350, 351, 352, and 353 in accordance with the more significant binary digits. Contacts associated with the relays are connected in a binary tree to supply a direct connection from the ground supplied to terminal 354 to one of the connections in lead group 18 in accordance with the required movement in steps of 0.8 inch through the entire range of operation of the latch assembly.

In order to sense the approach to the desired position and slow down the movement of the carriage in response to this sensing, a constrictor valve 13 has been provided in the hydraulic line controlling movement of the work platform. By suitably dimensioning the configuration of the brushes, latch width, and rack teeth width, operation of this constrictor valve by electric power may be employed. For example, in one embodiment of my invention it was found feasible to allow each brush to contact the commutator bar 0.6-inch before the selected latch was in position to engage the rack. This dimensioning will complete an electric circuit from the power source 341 through constrictor valve 13 to ground through the appropriate brush. The flow of electric energy energizes the constriction valve 13, such as a solenoid-operated valve to constrict hydraulic flow, thereby slowing down worktable movement. The sensing of approach to the described position without the need for a complex comparison system, is highly desirable in many applications. The exact amount of anticipation, or the distance before the desired position that the constrictor valve operates, will vary with the individual application. The only limitation upon the anticipation is that no ambiguity can be tolerated in the engagement of the latches with the rack. Prevention of ambiguity, or a position where a latch other than that selected could also engage a rack tooth, is controlled by latch design. As shown by Figure 2 the width of the latch, the bevel section and the tooth width provides a portion of travel where incipient engagement only is permitted before entry of the latch into a land. This arrangement allows anticipation over a range of movement without ambiguity in engaged position. The anticipation can be increased by increasing latch and corresponding land width.

Figure 4:
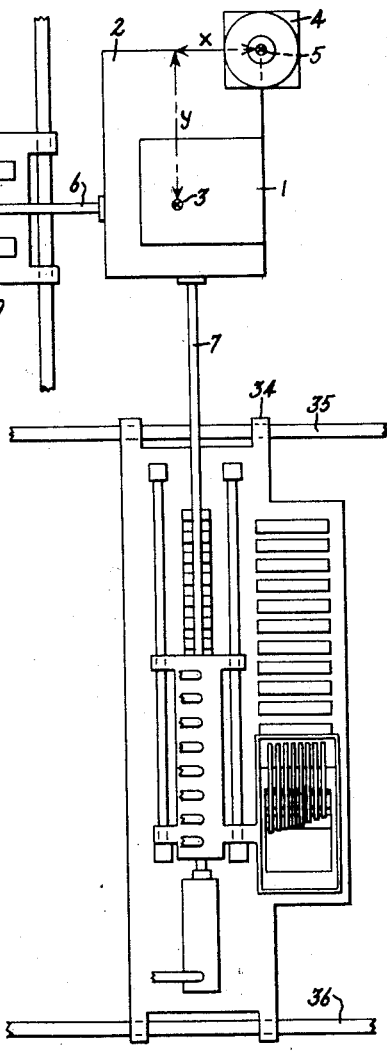
Figure 4 is a detailed view of one portion of the apparatus shown in Figure 1.
Figure 4:
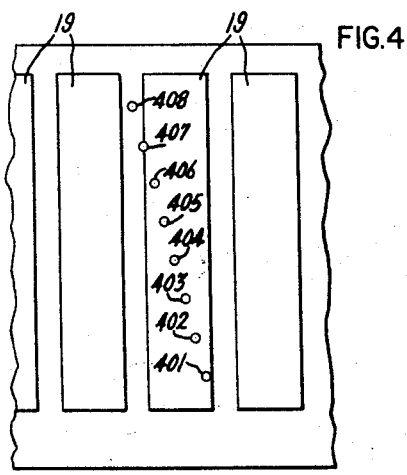

To provide the maximum amount of pre-sensing or anticipation I have staggered the points of contact of the brushes with respect to the commutator sections. This is shown in Figure 4 in which the contact points 401 through 408 represent the points of contact of the brushes with the commutator section. The degree of staggering allows the maximum amount of anticipation of approach to the desired position without the possibility of having points of ambiguity where two latches could engage. It is, of course, possible to utilize a straight brush contact arrangement with a narrower commutator bar if a smaller amount of anticipation is tolerable.

It will be apparent to those skilled in the art that the latch assembly can remain fixed with the rack moveable with the object without departing from my invention.

While I have shown and described particular embodiments of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, a rack having teeth and interposed lands, said teeth having a width of at least 0.1 inch and spaced apart by 0.8 inch, a latch assembly, said latch assembly comprising eight latches spaced 0.9 inch apart, said latches being of substantially equal but no greater width than the width of the lands on said rack, and means for driving a selected one of said latches into a land.

2. In combination, a rack having teeth and interposed lands, the combined length of one of said lands and one of said teeth being 0.8 inch, a latch assembly operably connected for movement along said rack, said latch assembly comprising eight latches spaced 0.9 inch apart, said latches operably connected to engage said rack by insertion within one of said lands, means for driving a selected one of said latches into engagement with said rack, and means for operating said driving means at a desired point in said movement.

3. In combination, a rack having teeth and interposed lands, said teeth being spaced apart by a first predetermined interval, a latch assembly operably connected for movement along said rack, said latch assembly comprising a plurality of latches spaced apart by a second predetermined interval, said second interval being a third predetermined interval greater than said first interval, and means responsive to said movement in integral multiples including zero of said third interval for engaging one of said latches with said rack.

4. Positioning apparatus for locating an object at a fixed position, comprising means for moving said object along coordinates defining positions on said object, and separate means for stopping said object at positions along a respective coordinate, each of said stopping means comprising a rack, having teeth and lands, disposed parallel to said coordinate, a latch assembly moveable over said rack, said latch assembly comprising a plurality of latches, each of said latches operably connected to engage said rack at a different point of movement of said latch assembly, and means responsive to the position of said latch assembly to engage one of said latches with said rack thereby stopping said object at a desired point.

5. Positioning apparatus for locating an object at a desired position in response to an input signal, comprising means for moving said object along coordinates defining points on said object, separate, identical means for stopping said object at points on each of said coordinates, one of said stopping means comprising a rack disposed along a respective coordinate, a latch assembly moveable along said rack, said latch assembly comprising a plurality of latches, each of said latches operably connected to engage said rack at a different point of latch assembly movement, latch operating means operably connected to engage one of said latches with said rack to stop said object, and means responsive to said input signal for energizing said operating means to stop said object at said desired position.

6. Positioning apparatus for locating an object at a desired position in response to a digitally coded input signal comprising means for moving said object along coordinates defining points on said object, a separate rack extending along each of said coordinates, respective latch assemblies moveable over each of said racks, each of said latch assemblies comprising a plurality of latches, each of said latches operably connected to fully engage a respective rack at a different point of movement of said associated latch assembly, means for selecting one latch in each latch assembly in response to said input signal, means for driving said selected latches into incipient engagement with said racks before said desired position is reached, means simultaneously operative with said driving means for slowing the rate of object movement, and means maintaining said incipient engagement until said object reaches a desired position whereupon each of said latches fully engages said racks to stop said objects.

7. In combination, a rack having teeth and interposed lands, said teeth being spaced apart by a first predetermined interval, a latch assembly, said latch assembly comprising a plurality of latches spaced apart by a second predetermined interval, said rack and latch assembly operably connected for relative movement therebetween, said second interval being a third predetermined interval greater than said first interval, and means responsive to said movement in integral multiples including zero of said third interval for engaging one of said latches with said rack.

8. Positioning apparatus for locating an object at a fixed position, comprising means for moving said object along coordinates defining positions on said object, and separate means for stopping said object at positions along a respective coordinate, each of said stopping means comprising a rack, having teeth and lands, disposed parallel to said coordinate, a latch assembly, said rack moveable with said object and relative to said latch assembly, said latch assembly comprising a plurality of latches, each of said latches operably connected to engage said rack at a different point of movement of said object, and means responsive to the position of said object to engage one of said latches with said rack thereby stopping said object at a desired point.

9. Positioning apparatus for locating an object at a desired position in response to an input signal, comprising means for moving said object along coordinates defining points on said object, separate, identical means for stopping said object at points on each of said coordinates, one of said stopping means comprising a rack disposed along a respective coordinate, a latch assembly, said rack moveable with said object and relative to said latch assembly, each of said latches operably connected to engage said rack at a different point of object movement, latch operating means to engage one of said latches with said rack to stop said object, and means responsive to said input signal for energizing said operating means to stop said object at said desired position.

10. Positioning apparatus for locating an object at a desired position in response to a digitally coded input signal comprising means for moving said object along coordinates defining points on said object, a separate rack extending along each of said coordinates, respective latch assemblies, said respective rack and latch assembly operably connected for relative movement in accordance with object movement, each of said latch assemblies comprising a plurality of latches, each of said latches operably connected to fully engage a respective rack at a different point of movement of said object movement, means for selecting one latch in each latch assembly in response to said input signal, means for driving said selected latches into incipient engagement with said racks before said desired position is reached, means simultaneously operative with said driving means for slowing the rate of object movement, and means maintaining said incipient engagement until said object reaches a desired position whereupon each of said latches fully engages said racks to stop said object.

References Cited in the file of this patent

UNITED STATES PATENTS

| | | |
|---|---|---|
| 2,591,344 | Elliott | Apr. 1, 1952 |
| 2,752,427 | Kilburg | June 26, 1956 |

FOREIGN PATENTS

| | | |
|---|---|---|
| 648,301 | Great Britain | Jan. 3, 1951 |